(12) United States Patent
Gupta et al.

(10) Patent No.: US 11,829,328 B2
(45) Date of Patent: Nov. 28, 2023

(54) GARBAGE COLLECTION FROM ARCHIVAL OF STORAGE SNAPSHOTS

(71) Applicant: Nutanix, Inc., San Jose, CA (US)

(72) Inventors: Abhishek Gupta, Ghaziabad (IN); Andrey Alexseyevich Pyatkov, Seattle, WA (US); Angshuman Bezbaruah, Redmond, WA (US); Artem Yevgenyevich Livshits, Bellevue, WA (US); Brajesh Kumar Shrivastava, Bengaluru (IN); Karan Gupta, San Jose, CA (US); Prakash Narayanasamy, Saratoga, CA (US)

(73) Assignee: Nutanix, Inc., San Jose, CA (US)

( * ) Notice: Subject to any disclaimer, the term of this patent is extended or adjusted under 35 U.S.C. 154(b) by 217 days.

(21) Appl. No.: 17/514,603

(22) Filed: Oct. 29, 2021

(65) Prior Publication Data

US 2023/0079621 A1 Mar. 16, 2023

(51) Int. Cl.
*G06F 16/11* (2019.01)
*G06F 12/02* (2006.01)
*G06F 16/174* (2019.01)

(52) U.S. Cl.
CPC ........ *G06F 16/125* (2019.01); *G06F 12/0253* (2013.01); *G06F 16/113* (2019.01); *G06F 16/128* (2019.01); *G06F 16/1748* (2019.01); *G06F 2212/702* (2013.01); *G06F 2212/7205* (2013.01)

(58) Field of Classification Search
CPC .... G06F 16/125; G06F 16/113; G06F 16/128; G06F 12/0253; G06F 16/1748

USPC .......................................... 707/664; 711/162
See application file for complete search history.

(56) References Cited

U.S. PATENT DOCUMENTS

| | | | |
|---|---|---|---|
| 7,725,671 | B2 | 5/2010 | Prahlad et al. |
| 7,840,533 | B2 | 11/2010 | Prahlad et al. |
| 8,447,728 | B2 | 5/2013 | Prahlad et al. |
| 8,549,518 | B1 | 10/2013 | Aron et al. |

(Continued)

OTHER PUBLICATIONS

Citrix XenDesktop 7.1 on Microsoft Hyper-V Server 2012 R2 on Nutanix Virtual Computing Platform Solution Design Citrix Validated Solutions Jun. 25, 2014, 95 pages.

(Continued)

*Primary Examiner* — Shahid A Alam
(74) *Attorney, Agent, or Firm* — Cesari and McKenna, LLP (57) ABSTRACT

A technique improves storage efficiency of an object store configured to maintain numerous snapshots for long-term storage in an archival storage system by efficiently determining data that is exclusively owned by an expiring snapshot to allow deletion of the expiring snapshot from the object store. The technique involves managing index data structures to enable efficient garbage collection across a very large number of data objects. When a snapshot expires, the technique obviates the need to scan the numerous snapshot data objects to determine which index structures are no longer needed and can be reclaimed (garbage collected). The technique is directed to management of underlying storage based on different sets of policies. When certain snapshots expire and are ready for deletion, the technique is directed to finding those data blocks that are no longer referenced (used) by any valid snapshots.

24 Claims, 9 Drawing Sheets

(56) References Cited

U.S. PATENT DOCUMENTS

| | | |
|---|---|---|
| 8,601,473 B1 | 12/2013 | Aron et al. |
| 8,762,335 B2 | 6/2014 | Prahlad et al. |
| 8,850,130 B1 | 9/2014 | Aron et al. |
| 8,863,124 B1 | 10/2014 | Aron et al. |
| 9,009,106 B1 | 4/2015 | Aron et al. |
| 9,047,312 B1 | 6/2015 | Ten-Pow |
| 9,069,708 B2 | 6/2015 | Gill et al. |
| 9,251,066 B2* | 2/2016 | Colgrove ............ G06F 16/1748 |
| 9,336,132 B1 | 5/2016 | Aron et al. |
| 9,652,265 B1 | 5/2017 | Narayanasamy et al. |
| 9,740,723 B2 | 8/2017 | Prahlad et al. |
| 9,747,287 B1 | 8/2017 | Bhardwaj et al. |
| 9,772,866 B1 | 9/2017 | Aron et al. |
| 10,198,321 B1* | 2/2019 | Gordon ................. G06F 16/128 |
| 10,210,048 B2 | 2/2019 | Sancheti |
| 10,248,657 B2 | 4/2019 | Prahlad et al. |
| 10,831,608 B2 | 11/2020 | Prahlad et al. |
| 10,922,132 B1 | 2/2021 | Shiramshetti |
| 2006/0265713 A1 | 11/2006 | Depro |
| 2007/0271431 A1* | 11/2007 | Hwang ............... G06F 11/1471 711/162 |
| 2008/0244205 A1 | 10/2008 | Amano |
| 2013/0305002 A1* | 11/2013 | Hallak .................. G06F 3/0683 711/162 |
| 2014/0006357 A1 | 1/2014 | Davis |
| 2014/0244935 A1* | 8/2014 | Ezra ...................... G06F 3/0614 711/133 |
| 2014/0281307 A1* | 9/2014 | Peterson ............... G06F 16/128 711/162 |
| 2015/0178167 A1 | 6/2015 | Kulkarni |
| 2017/0351434 A1 | 12/2017 | Nakajima |
| 2018/0276224 A1 | 9/2018 | Natanzon |
| 2018/0332121 A1 | 11/2018 | Burba |
| 2019/0004735 A1 | 1/2019 | Spillane |
| 2019/0073378 A1 | 3/2019 | Guturi |
| 2019/0179918 A1 | 6/2019 | Singh |
| 2019/0213123 A1 | 7/2019 | Agarwal |
| 2019/0332268 A1 | 10/2019 | Greenwood |
| 2019/0384678 A1 | 12/2019 | Samprathi et al. |
| 2020/0233835 A1 | 7/2020 | Guturi et al. |

OTHER PUBLICATIONS

Cano, Ignacio, et al. "Curator: Self-Managing Storage for Enterprise Clusters" (Mar. 27, 2017), from https://www.usenix.org/conference/nsdi17/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven "The Nutanix Bible" from https://nutanixbible.com/, Sep. 17, 2019.

* cited by examiner

GARBAGE COLLECTION FROM ARCHIVAL OF STORAGE SNAPSHOTS

CROSS-REFERENCE TO RELATED APPLICATION

The present application claims the benefit of India Provisional Patent Application Serial No. 202141041611, which was filed on Sep. 15, 2021, by Abhishek Gupta, et al. for GARBAGE COLLECTION FROM ARCHIVAL OF STORAGE SNAPSHOTS, which is hereby incorporated by reference.

BACKGROUND

Technical Field

The present disclosure relates to archival of data and, more specifically, to efficient garbage collection of expired snapshots in an archival storage system.

Background Information

File systems are primarily configured to process (i.e., store and retrieve) active input/output (I/O) data streams issued by, e.g., a user application executing in a virtual machine of a storage system. Such file systems are not generally configured to maintain large quantities of snapshots for long-term storage and retention in an archival storage system because they are primarily designed for rapid application of changes (e.g., as "live" data) to support immediate access requests. These file systems with snapshots generally process data indexing/location information together with storage layout and data storage to facilitate the immediate access requests. However, an archival storage system is configured to maintain large quantities of snapshots for long-term storage and retention across numerous storage objects. Accordingly, management of consumed storage is essential to reduce a storage footprint as any of these snapshots may expire at any time, thus necessitating an efficient culling of storage across the numerous storage objects.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a technique for improving storage efficiency of an object store configured to maintain numerous snapshots for long-term storage in an archival storage system by efficiently determining data that is exclusively owned by an expiring snapshot to allow deletion of the expiring snapshot from the object store. To that end, the technique involves managing index data structures (B+ trees) to enable efficient garbage collection (GC) across a very large number of data objects. When a snapshot expires, the technique obviates the need to scan the numerous snapshot data objects to determine which index structures are no longer needed and can be reclaimed (garbage collected). As used herein, a "data object" is an object (e.g., an Amazon S3 object) that contains data blocks of one or more snapshots. Notably, the data object may be shared between one or more snapshots. An issue with GC for such indexing data structures involves the fact that many data blocks are shared across snapshots for storage efficiency. The technique includes an algorithm that determines which data objects of data storage units exclusively own data blocks of expired snapshots by, e.g., scanning indexes of immediate parent and child data storage units and, as a result, whether the data storage unit is a candidate for GC. The technique also determines which data objects can be reclaimed when a snapshot expires.

The GC technique may be used to identify which data (blocks) are owned exclusively by which snapshots. The technique is directed to management of underlying storage based on different sets of policies (defined by a user/administrator). Because underlying storage is shared among multiple snapshots and only changed (delta) data blocks are new and considered unshared storage, when certain snapshots expire and are ready for deletion, the technique is directed to finding those data blocks that are no longer referenced (used) by any valid snapshots. The technique thus leverages the cost of computationally (e.g., vendor computational services charges) finding blocks of the expired snapshot that are no longer referenced by the valid snapshots versus the storage efficiency cost (e.g., storage vendor storage charged) of keeping the expired snapshot around longer (balancing cost tradeoff).

DESCRIPTION

Figure 1:
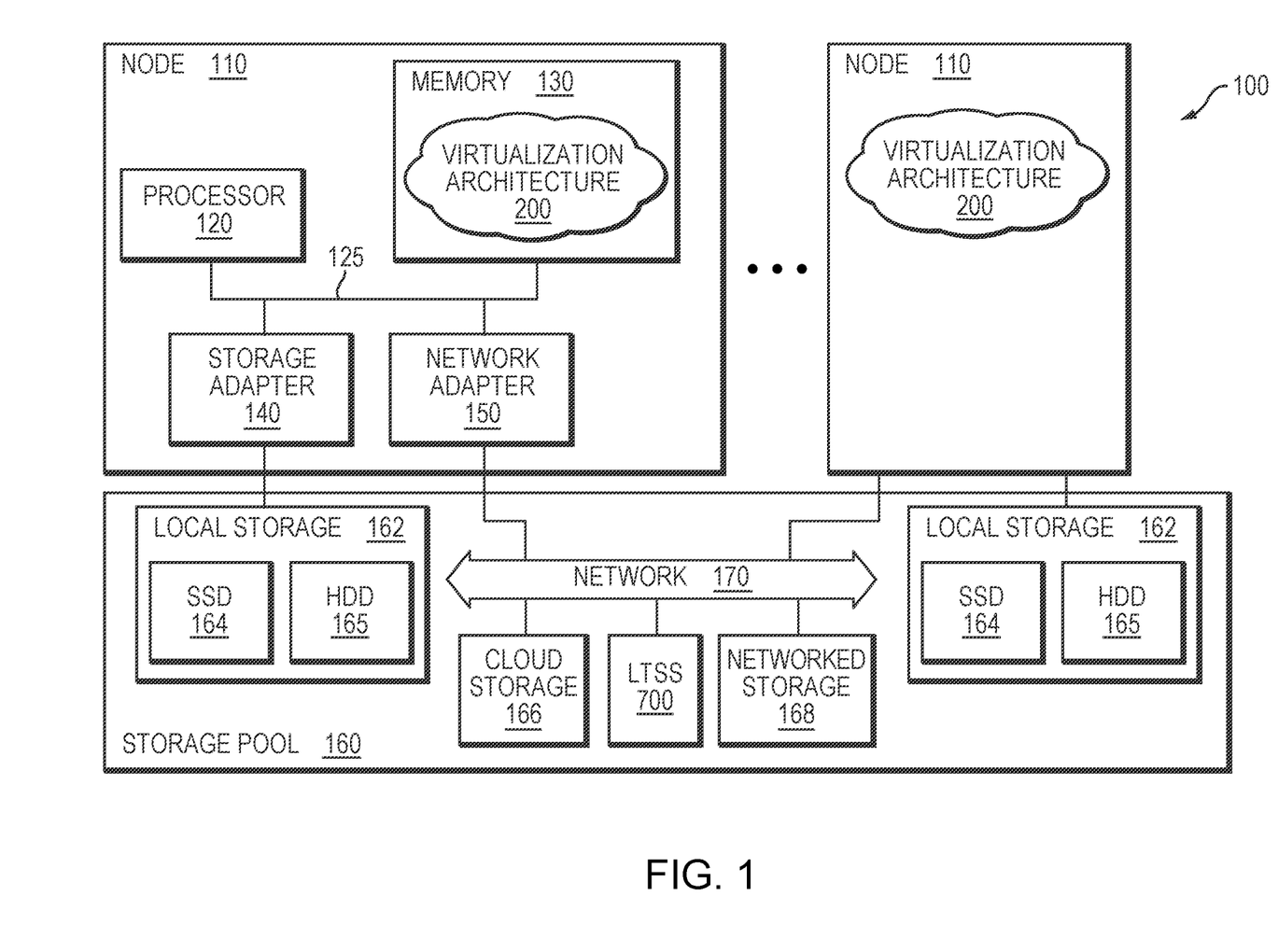
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over network 170, which is illustratively an Ethernet local area network (LAN). The network adapter 150 may thus be embodied as a network interface card having the mechanical, electrical and signaling circuitry needed to connect the node 110 to the network 170. The multiple tiers of SOCS include storage that is accessible through the network 170, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. As described herein, a long-term storage service (LTSS 700) of an archival storage system provides storage of large numbers (amounts) of point-in-time images or recovery points (i.e., snapshots) of application workloads on an object store. Communication over the network 170 may be effected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS), as well as specialized application program interfaces (APIs) may also be advantageously employed.

Figure 2:
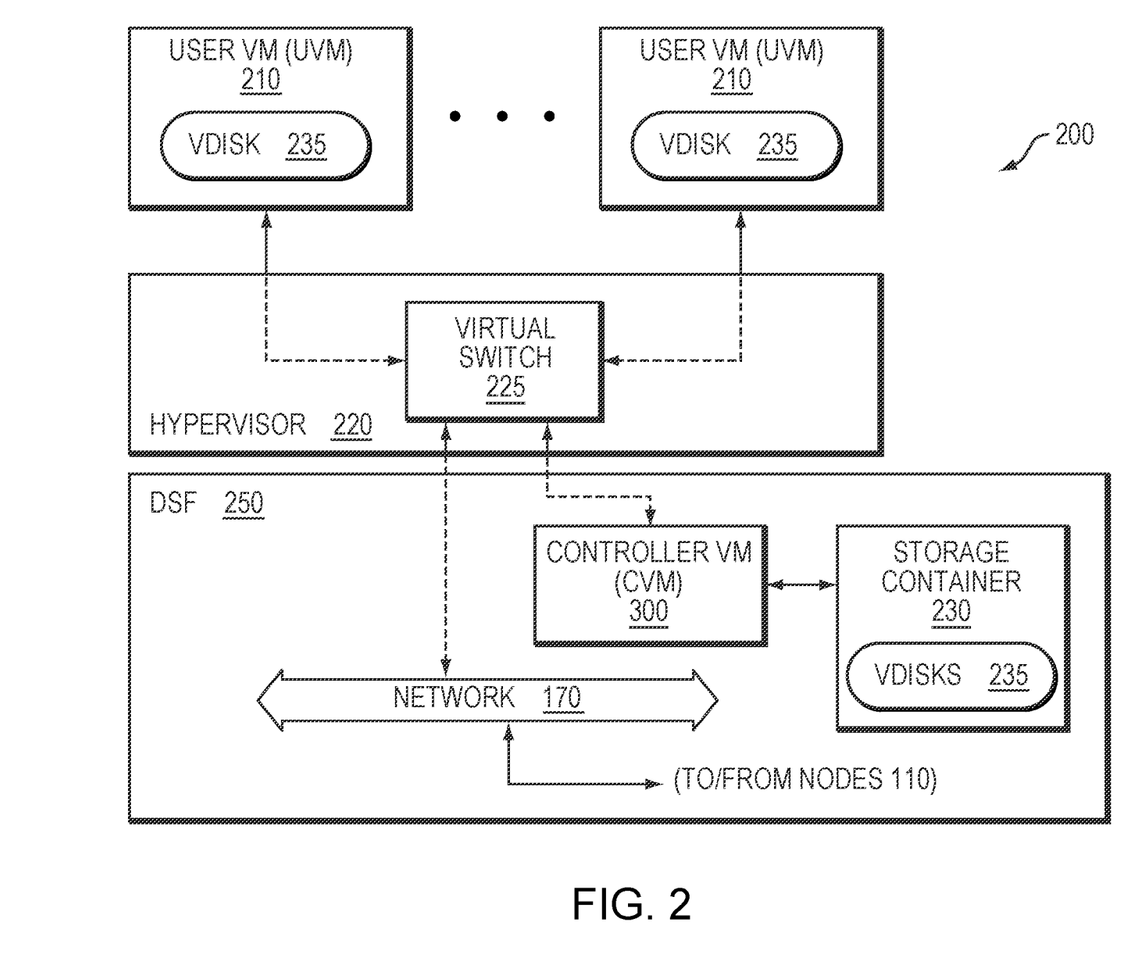
FIG. 2 is a block diagram of a virtualization architecture executing on a node to implement the virtualization environment.

The main memory 120 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyperconvergence architecture wherein the nodes provide both storage and computational resources available cluster-wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIF'S, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSP 250 of the cluster 100.

In an embodiment, the virtual switch 225 may be employed to enable IiO accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an CIFS, or NFS request as part of its hardware emulation layer. As previously, noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms CIES and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires 110 services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably, the IP-based storage protocol request packets may remain in the node 110 when the communication the request and the response begins and ends within the hypervisor 220. In other embodiments, the IP-based storage protocol request may be routed by the virtual switch 225 to a CVM 300 on another node of the cluster 100 for processing. Specifically, the IP-based storage protocol request is forwarded by the virtual switch 225 to a physical switch (not shown) for transmission over network 170 to the other node. The virtual switch 225 within the hypervisor 220 on the other node then forwards the request to the CVM 300 on that node for further processing.

Figure 3:
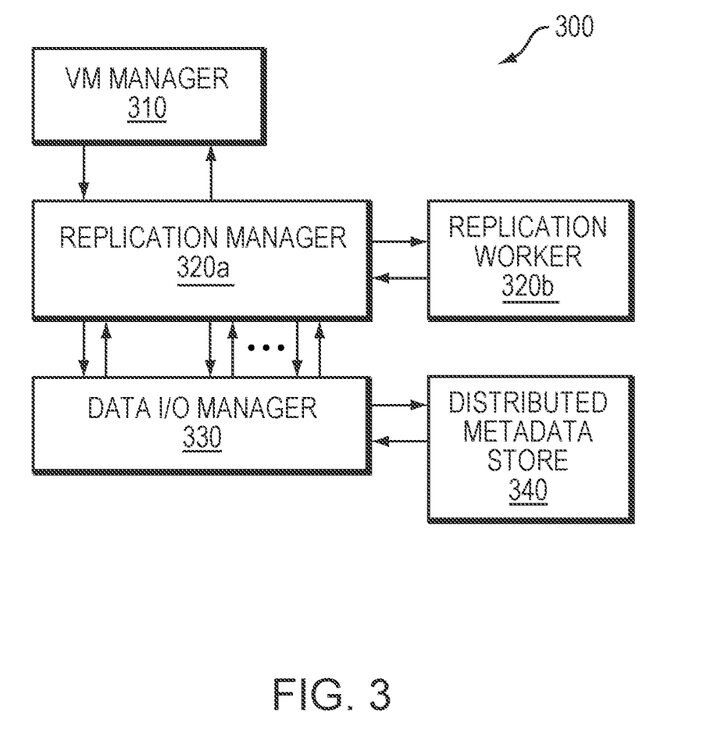
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the duster 100. Illustratively, the CVM 300 runs as a virtual machine above the hypervisor 220 on each node and cooperates with other CVMs in the duster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., CIPS, and NFS) supported by the CVM.

Illustratively, the CVM 300 includes a plurality of processes embodied as a storage stack running in a user space of the operating system of the CVM to provide storage and I/O management services within DSF 250. The processes include a virtual machine (VM) manager 310 configured to manage creation, deletion, addition and removal of virtual machines (such as UVMs 210) on a node 110 of the cluster 100. For example, if a UVM fails or crashes, the VM manager MO may spawn another UVM 210 on the node. A replication manager 320a is configured to provide replication and disaster recovery capabilities of DSF 250. Such capabilities include migration/failover of virtual machines and containers, as well as scheduling of snapshots. In an embodiment, the replication manager 320a may interact with one or more replication workers 320b. A data manager 330 is responsible for all data management and I/O operations in DSF 250 and provides a main interface to/from the hypervisor 220. e.g., via the IP-based storage protocols. Illustratively, the data UO manager 330 presents a vdisk 235 to the UVM 210 in order to service 110 access requests by the UVM to the DFS. A distributed metadata store 340 stores and manages all metadata in the node/cluster, including metadata structures that store metadata used to locate (map) the actual content of vdisks on the storage devices of the cluster.

Figure 4:
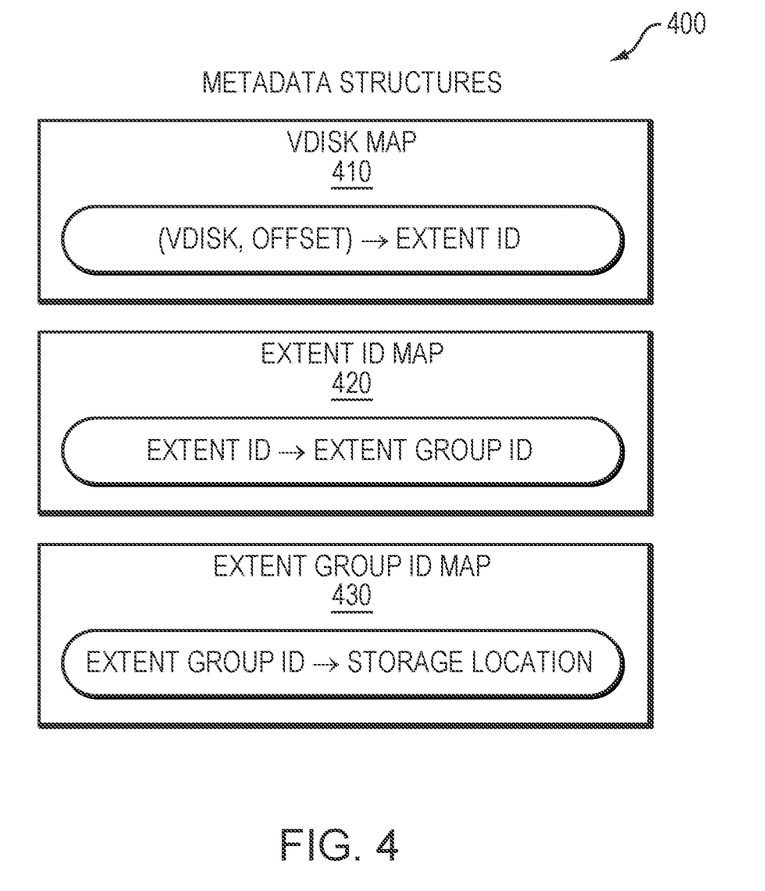
FIG. 4 is a block diagram of metadata structures used to map virtual disks (vdisks) of the virtualization architecture.

FIG. 4 is a block diagram of metadata structures 400 used to map virtual disks of the virtualization architecture. Each vdisk 235 corresponds to a virtual address space for storage exposed as a disk to the UVMs 210. Illustratively, the address space is divided into equal sized units called virtual blocks (vblocks). A vblock is a chunk of predetermined storage, e.g., 1 MB, corresponding to a virtual address space of the vdisk that is used as the basis of metadata block map structures described herein. The data in each vblock is physically stored on a storage device in units called extents. Extents may, be written/read/modified on a sub-extent basis (called a slice) for granularity and efficiency. A plurality of extents may, be grouped together in a unit called an extent group. Each extent and extent group may be assigned a unique identifier (ID), referred to as an extent ID and extent group ID, respectively. An extent group is a unit of physical allocation that is stored as a file on the storage devices.

Illustratively, a first metadata structure embodied as a vdisk map 410 is used to logically map the vdisk address space for stored extents. Given a specified vdisk and offset, the logical vdisk map 410 may be used to identify a corresponding extent (represented by extent ID). A second metadata structure embodied as an extent ID map 420 is used to logically map an extent to an extent group. Given a specified extent ID, the logical extent ID map 420 may be used to identify a corresponding extent group containing the extent. A third metadata structure embodied as an extent group ID map 430 is used to map a specific physical storage location for the extent group. Given a specified extent group ID, the physical extent group ID map 430 may be used to identify information corresponding to the physical location of the extent group on the storage devices such as, for example, (1) an identifier of a storage device that stores the extent group, (2) a list of extent IDs corresponding to extents in that extent group, and (3) information about the extents, such as reference counts, checksums, and offset locations.

Figure 5A:
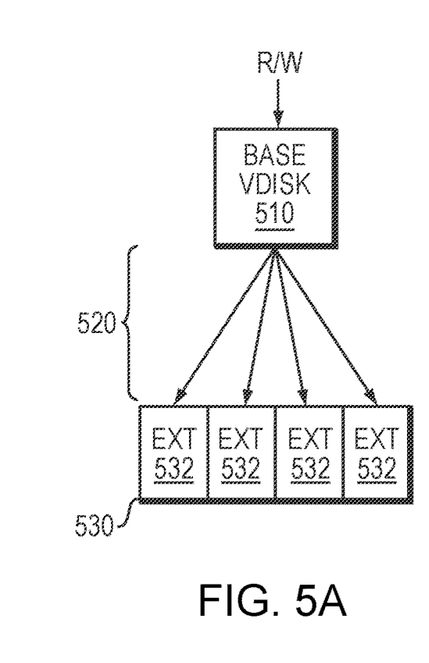
FIGS. 5A-5C are block diagrams of an exemplary mechanism used to create a snapshot of a vdisk.
Figure 5B:
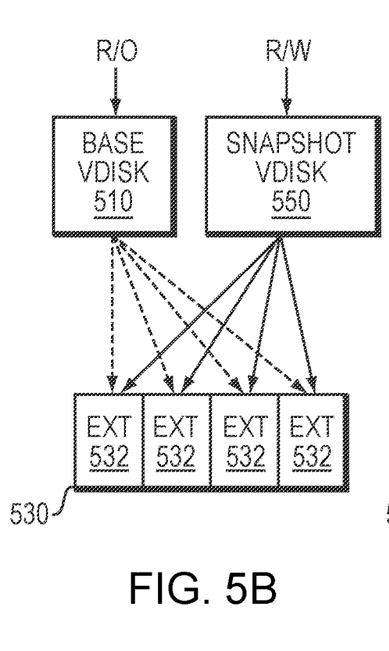
Figure 5C:
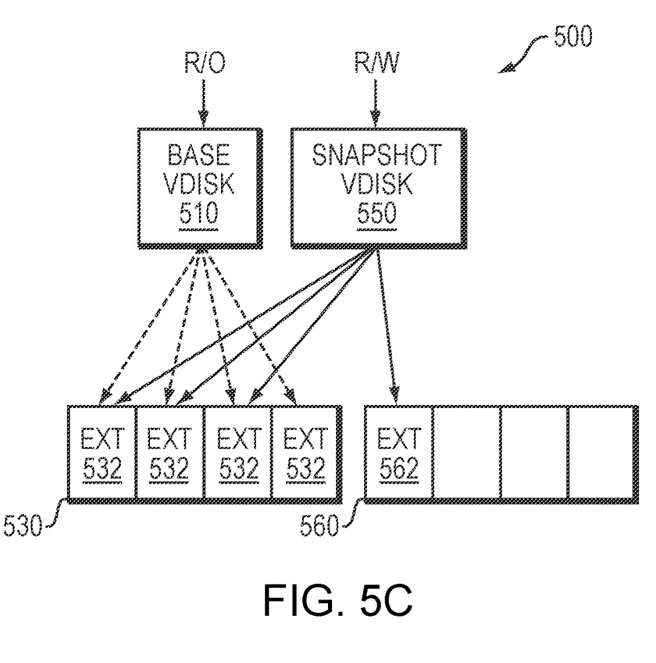

In an embodiment, CVM 300 and DSF 250 cooperate to provide support for snapshots, which are point-in-time copies of storage objects, such as files, LUNs and/or vdisks. FIGS. 5A-5C are block diagrams of an exemplary mechanism 500 used to create a snapshot of a virtual disk. Illustratively, the snapshot may be created by leveraging an efficient low overhead snapshot mechanism, such as the redirect-on-write algorithm. As shown in FIG. 5A, the vdisk (base vdisk 510) is originally marked read/write (R/W) and has an associated block map 520, metadata mapping with pointers that reference (point to) the extents 532 of an extent group 530 storing data of the vdisk on storage devices of DSF 250, Advantageously, associating a block map with a vdisk obviates traversal of a snapshot chain, as well as corresponding overhead (e.g., read latency) and performance impact.

To create the snapshot (FIG. 5B), another vdisk (snapshot vdisk 550) is created by sharing the block map 520 with the base vdisk 510. This feature of the low overhead snapshot mechanism enables creation of the snapshot vdisk 550 without the need to immediately copy the contents of the base vdisk 510. Notably, the snapshot mechanism uses redirect-on-write such that, from the UVM perspective, I/O accesses to the vdisk are redirected to the snapshot vdisk 550 which now becomes the (live) vdisk and the base vdisk 510 becomes the point-in-time copy, i.e., an "immutable snapshot," of the vdisk data. The base vdisk 510 is then marked immutable, e.g., read-only (R/O), and the snapshot vdisk 550 is marked as mutable, e.g., read/write (R/W), to accommodate new writes and copying of data from the base vdisk to the snapshot vdisk. In an embodiment, the contents of the snapshot vdisk 550 may be populated at a later time using, e.g., a lazy copy procedure in which the contents of the base vdisk 510 are copied to the snapshot vdisk 550 over time. The lazy copy procedure may configure DST 250 to wait until a period of light resource usage or activity to perform copying of existing data in the base vdisk. Note that each vdisk includes its own metadata structures 400 used to identify and locate extents owned by the vdisk.

Another procedure that may be employed to populate the snapshot vdisk 550 waits until there is a request to write modify) data in the snapshot vdisk 550, Depending upon the type of requested write operation performed on the data, there may or may not be a need to perform copying of the existing data from the base vdisk 510 to the snapshot vdisk 550. For example, the requested write operation may completely or substantially overwrite the contents of a vbloCk in the snapshot vdisk 550 with new data. Since the existing data of the corresponding vblock in the base vdisk 510 will be overwritten, no copying of that existing data is needed and the new data may be written to the snapshot vdisk at an unoccupied location on the DSF storage (FIG. 5C). Here, the block map 520 of the snapshot vdisk 550 directly references a new extent 562 of a new extent group 560 storing the new data on storage devices of DSF 250. However, if the requested write operation only overwrites a small portion of the existing data in the base vdisk 510, the contents of the corresponding vblock in the base vdisk may be copied to the snapshot vdisk 550 and the new data of the write operation may be written to the snapshot vdisk to modify that portion of the copied vblock. A combination of these procedures may be employed to populate the data content of the snapshot vdisk.

Figure 6:
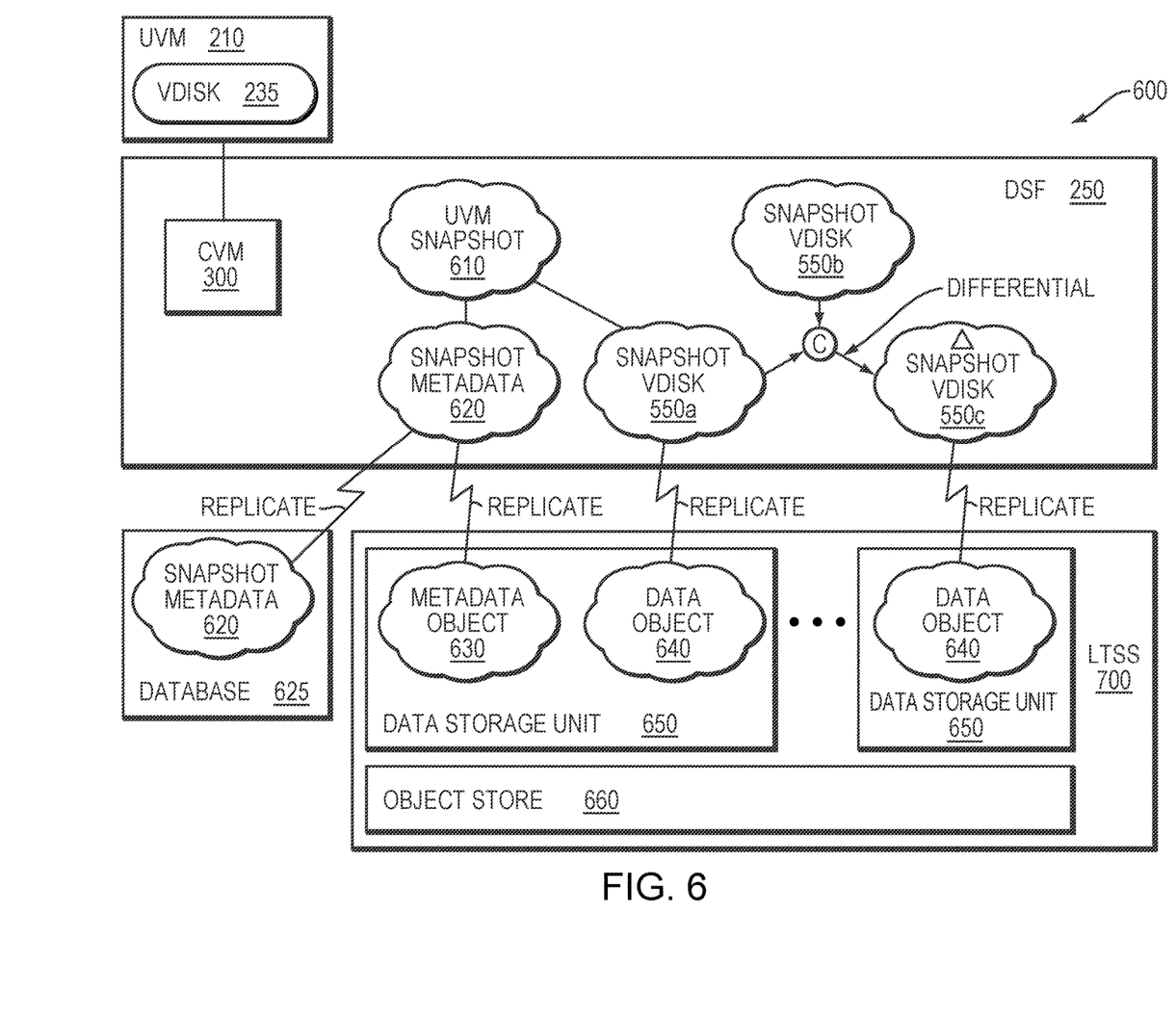
FIG. 6 is a block diagram of an exemplary data replication environment configured to replicate snapshots for storage to a long-term storage service (LTSS) of an archival storage system.

FIG. 6 is a block diagram of an exemplary data replication environment 600 configured to replicate snapshots for storage to the LTSS of the archival storage system. The architecture of LTSS 700 is configured to process large amounts of point-in-time images or recovery points (i.e., snapshots) of application workloads for storage on an object store 660 (archival storage vendor such as Amazon AWS S3 storage services, Google Cloud Storage, Microsoft Azure Cloud Storage and the like), wherein the workloads are characterized by a logical entity having typed data, e.g., a virtual machine (VM) such as a UVM 210. A client of LTSS 700 may be a distributed file system of a storage system (e.g., CVM 300 of DSF 250) that generates snapshots of the UVM (e.g., data processed by an application running in the UVM) and replicates the UVM snapshot 610 for storage in the object store 660. Replication, in this context, is directed to storage devices that exhibit incremental, block-level changes. LTSS 700 is thus a "generic" long-term storage service of an archival/backup storage system from the perspective of the client, i.e., the client flushes (delivers) data blocks of UVM snapshots 610 to the LTSS 700, which organizes the blocks for long-term storage in the object store 660. Each UVM snapshot 610 is generally handled as a data storage unit 650 by LTSS 700.

Illustratively, the content of each UVM snapshot 610 includes snapshot metadata and snapshot data, wherein the snapshot metadata 620 is essentially configuration information describing the logical entity (e.g., UVM 210) in terms of, e.g., virtual processor, memory, network and storage device resources of the UVM. The snapshot metadata 620 of the UVM 210 is illustratively replicated for storage in a query-able database 625 although, in an embodiment, the snapshot metadata 620 may be further replicated and organized as a metadata object 630 within a configuration namespace (e.g., bucket) of the object store 660 of LTSS 700 for long-term durability and availability. The data of the UVM 210 is virtualized as a disk (e.g., vdisk 235) and, upon generation of a snapshot, is processed as snapshot vdisk 550 of the UVM 210. The snapshot vdisk 550 is replicated, organized and arranged as one or more data objects 640 of the data storage unit 650 for storage in the object store 660. Each extent 532 of the snapshot vdisk 550 is a contiguous range of address space of a data object 640, wherein data blocks of the extents are "packed" into the data object 640 and accessible by, e.g., offsets and lengths. Note that a preferred size (e.g., 16 MB) of each data object 640 may be specified by the object store/vendor (e.g., AWS S3 cloud storage) for optimal use of the object store/vendor.

Operationally, the client initially generates a full snapshot of vdisk 235 (e.g., snapshot vdisk 550*a*) and transmits copies (i.e., replicas) of its data blocks to effectively replicate the snapshot vdisk 550*a* to LTSS 700. The snapshot vdisk 550*a* is thereafter used as a reference snapshot for comparison with one or more subsequent snapshots of the vdisk 235 (e.g., snapshot vdisk 550*b*) when computing incremental differences (deltas Δs). The client (e.g., CVM 300) generates the subsequent vdisk snapshots 550*b* at predetermined (periodic) time intervals and computes the deltas of these periodically generated snapshots with respect to the reference snapshot. The CVM 300 transmits replicas of data blocks of these deltas as Δ snapshot vdisk 550*c* to LTSS. From the perspective of the CVM 300, the LTSS 700 is a storage entity having an address on the network 170 (or WAN), similar to any networked storage 168. However, unlike networked storage 168, which is generally exposed to (accessed by) the CVM 300 using filesystem protocols such as NFS, CIFS and MST, the LTSS 700 is accessed using specialized application program interfaces (APIs) referred to herein as replication APIs, which have rich descriptive semantics. For example, a replication API may specify the snapshotted vdisk 550*a* of the logical entity (e.g., UVM 210) as well as information describing the snapshot metadata 620 and snapshot vdisk 550*a* of the entity. The CVM 300 then transmits (replicates) a stream of data blocks of the snapshotted vdisk 550*a* to LTSS 700.

Figure 7:
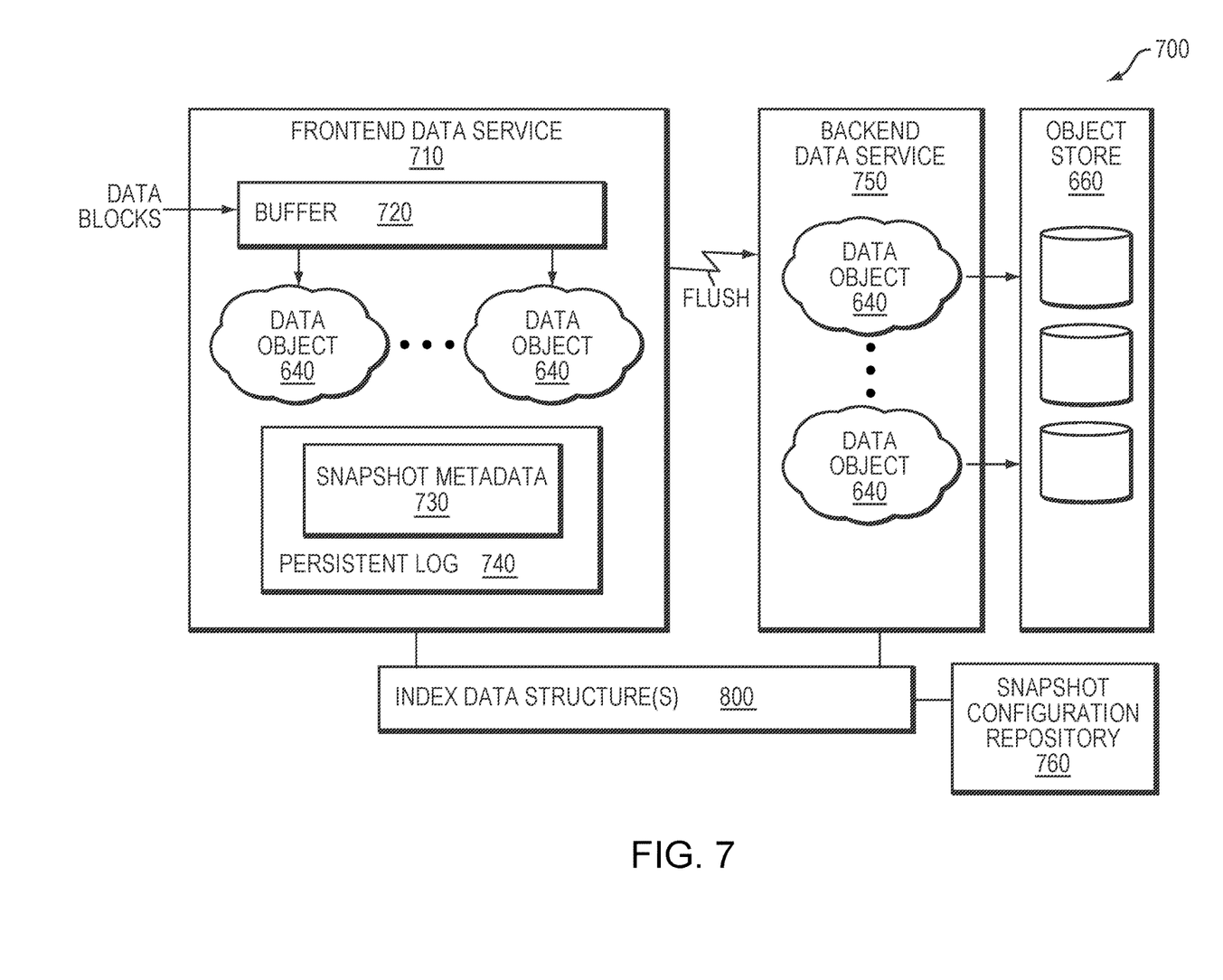
FIG. 7 is a block diagram of the LTSS of the archival storage system.

FIG. 7 is a block diagram of the LTSS 700 of the archival storage system.

Illustratively, the LTSS 700 includes two data services (processes): a frontend data service 710 that cooperates with the client (e.g., CVM 300) to organize large amounts of the replicated snapshot data (data blocks) into data objects 640 and a backend data service 750 that provides an interface for storing the data objects 640 in the object store 660. In an embodiment, the LTSS data services/processes may execute on a computing platform at any location and is generally "stateless" as all data/metadata are stored on the object store 660. Accordingly, the frontend data service 710 and backend data service 750 may run either locally on a node of an "on-prem" cluster or remotely on a node of an "in-cloud" cluster. In response to receiving an initial replication API directed to the snapshot vdisk 550*a*, the frontend data service 710 temporarily stores the stream of data blocks of the snapshot vdisk 550a, e.g., in a buffer 720 and writes the data blocks into one or more extents (i.e., contiguous, non-overlapping, variable-length regions of the vdisk) for storage in data objects 640 of a preferred size (e.g., 16 MB) as specified by the object store vendor for optimal use. The frontend data service 710 then forwards (flushes) the data objects 640 to the backend data service 750 for storage in the object store 660 (e.g., AWS S3). In response to receiving a subsequent replication API directed to the A snapshot vdisk 550c, the frontend data service temporarily stores the stream of data blocks of the A snapshot vdisk 550c in buffer 720, writes those data blocks to one or more data objects 640, and flushes the objects to the backend data service 750.

Figure 8:
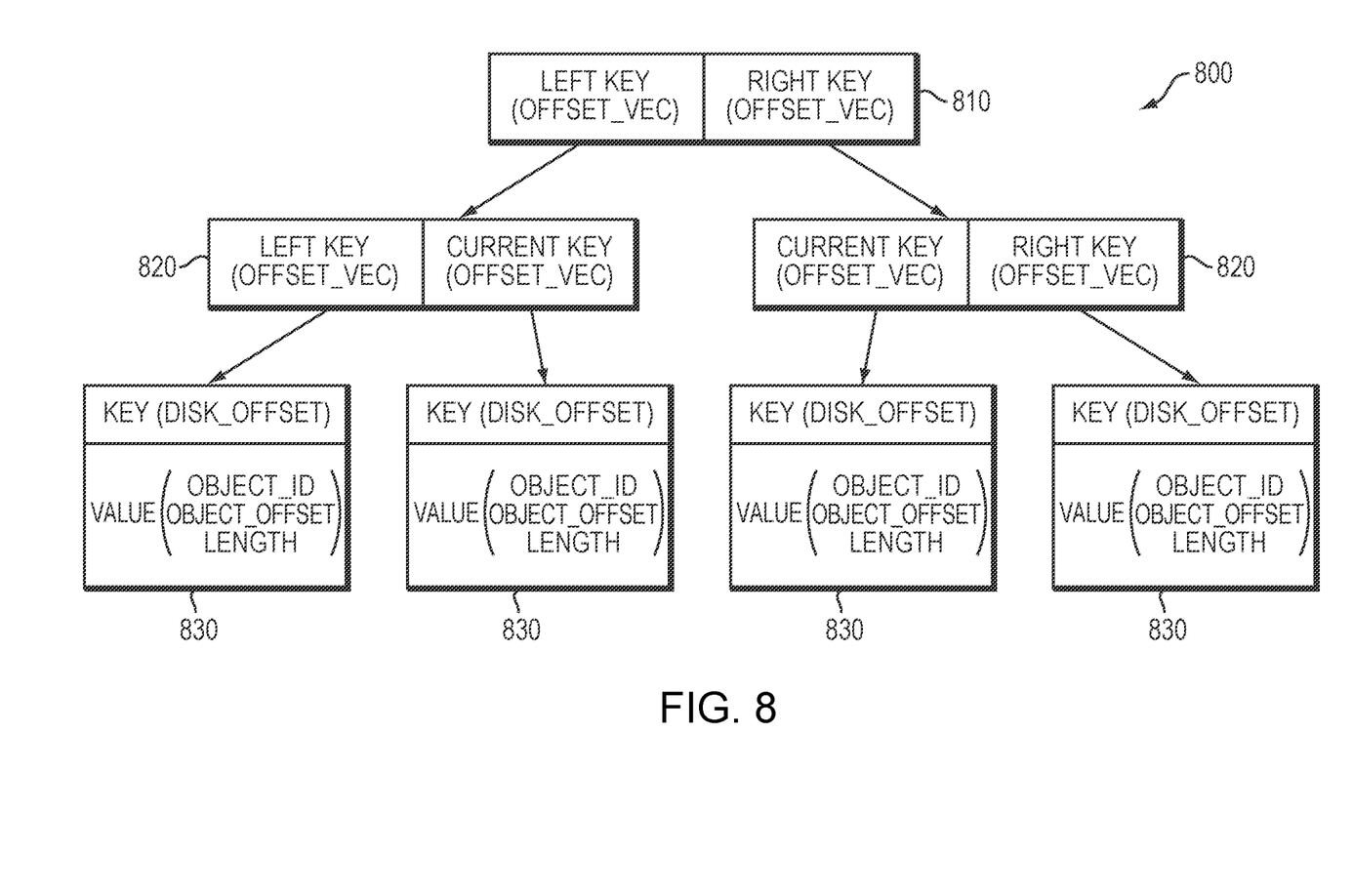
FIG. 8 is a block diagram illustrating an index data structure configured for efficient retrieval and garbage collection of snapshots of data from the LTSS.

Prior to flushing the data objects 640 to the backend data service 750, the frontend data service 710 creates metadata that keeps track of the amount of data blocks received from the CVM 300 for each replicated snapshot, e.g., snapshot vdisk 550a as well as A snapshot vdisk 550c. The metadata associated with the snapshot (i.e., snapshot metadata 730) is recorded as an entry in persistent storage media (e.g., a persistent log 740) local to the frontend data service 710. The snapshot metadata 730 includes information describing the snapshot data, e.g., a logical offset range of the snapshot vdisk 550. In an embodiment, the snapshot metadata 730 is stored as an entry of the persistent log 740 in a format such as, e.g., snapshot ID, logical offset range of snapshot data, logical offset into the data object to support storing multiple extents into a data object, and data object ID. The frontend data service 710 updates the snapshot metadata 730 of the log entry for each data object 640 flushed to the backend data service 750. Notably, the snapshot metadata 730 is used by the frontend data service 710 to construct the index data structure 800 of LTSS.

Illustratively, the index data structure 800 is configured to enable efficient identification (location) and retrieval of data blocks contained within numerous data objects 640 (snapshots) stored on the object store 660. Effectively, the index data structure acts as an independent database organized to retrieve data by extent of a vdisk (as recorded in the associated object store of the archival storage system) according to any snapshot. Notably, each snapshot is associated with a corresponding index data structure and may include incremental changes to a prior snapshot that may reference a prior index data structure associated with the prior snapshot. In this manner, only the incremental changes between snapshots need be stored in the archival storage system as indicated above, because later index data structures may reference (via prior index data structures) older blocks in prior snapshots.

FIG. 8 is a block diagram illustrating the index data structure 800 configured for efficient retrieval and garbage collection of snapshots from the LTSS of the archival storage system. In one or more embodiments, the index data structure 800 is illustratively a balanced tree (e.g., a B+ tree) with a large branching factor for internal nodes to maintain a limited depth of the tree, although other types of data structures, such as heaps and hashes, may be used with the embodiments described herein. When embodied as the B+ tree, the index data structure includes a root node 810, one or more intermediate (internal) nodes 820 and a plurality of leaf nodes 830. For the reference snapshot vdisk 550a, each internal node 820 contains a set of keys that specify logical offset ranges into the address space of the vdisk 550a and corresponding values that reference other nodes in the B+ tree (e.g., lower level internal nodes or leaf nodes). Each leaf node 830 contains a value describing (pointing to) a data object having the extent that includes selected data blocks corresponding to a specified logical offset range as well as a logical offset of the extent in the data object and length of the extent. In other words, a leaf node can be considered as a 4-tuple having: (i) a logical offset in the address space of the logical entity (e.g., snapshot), (ii) a data object id, (iii) a logical offset of the extent into the data object, and (iv) a length of the extent. To find the leaf node 830 pointing to a selected data block of a particular snapshot (data object) only requires traversing the depth of an index data structure. Notably, a large branching factor (e.g., 1024) for internal nodes permits a very large number of references in the internal nodes 820 of the B+ tree so that a depth of the tree is reduced (e.g., to 2 or 3 levels) enabling an effective bounded traversal time from the root node to a leaf node (e.g., traverse at most 3 nodes to locate data in the object store). The address space covered by the leaf nodes is of variable length and depends upon a number of extents referenced according to the branching factor. In an embodiment, the internal nodes have a branching factor much larger than the leaf nodes to support a very large address space (e.g., given an extent size of less than 1 MB and a branching factor of 32K, a two-level B-tree can reference an address space as great as 16 exabytes).

In an embodiment, each internal node 820 contains keys and pointers to children nodes, and generally not any values. The root node 810 is a variant of the internal node 820 but, similar to the internal node, contains disk offsets as keys. For each key, a left pointer points to data of the vdisk ranging from a left key to (and including) a current key; illustratively, data in a "child" internal node 820 for the left pointer embodies the form [left key, current key]. A right pointer points to data of the vdisk ranging from the current key to (but excluding) a right key; illustratively, data in a child internal node for the right pointer embodies the form [current key, right key]. The fields of the internal node illustratively include (i) Offset_Vec containing a list of offsets in the vdisk that function as one or more keys; and (ii) Child_Pointer_Vec containing a pointer(s) to a child(ren) node(s). The leaf node 830 contains a predetermined number of descriptors (e.g., up to 1024), each of which describes the vdisk address space covered by the descriptor and the location of the corresponding data in the form of the following keys and values:

Key (Disk_Offset)→Value (Object_ID, Object_Logical_Offset, Length) wherein Disk_Offset refers to the offset within the vdisk; Object_ID identifies the data object in the archival storage system and may be a combination of a vdisk uuid and an assigned predefined (int64) number; Object_Logical_Offset is the logical offset with the object (specified by Object_ID) at which the data resides; and Length is the number of contiguous bytes (size of the extent) beginning at "Offset" (Disk_Offset) that is pointed to by the key entry.

Figure 9:
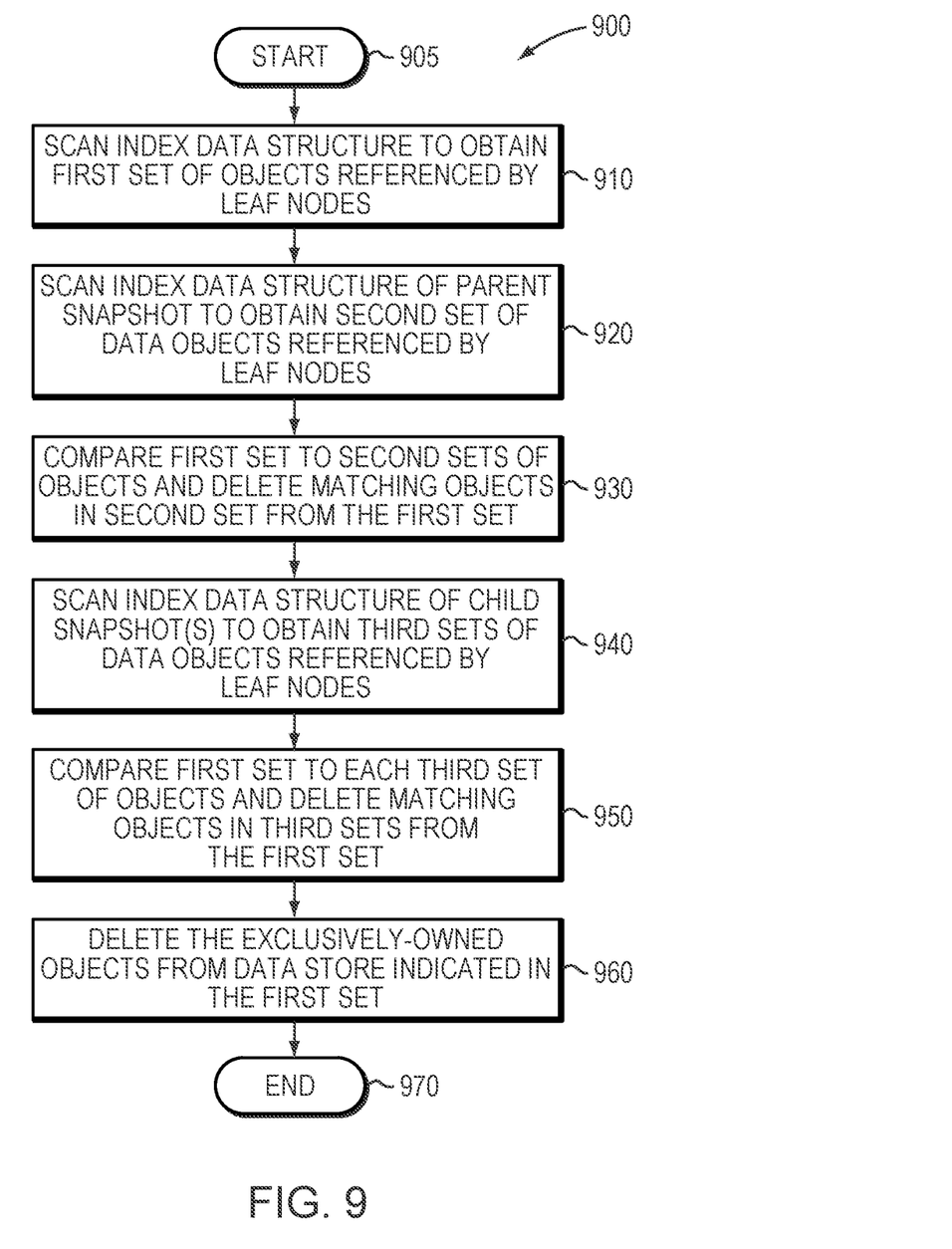
FIG. 9 is a flow chart of a procedure for performing garbage collection for data in the LTSS of the archival storage system.

The embodiments described herein are directed to a technique for improving storage efficiency of an object store configured to maintain numerous snapshots for long-term storage in an archival storage system by efficiently determining data that is exclusively owned by an expiring snapshot to allow deletion of the expiring snapshot from the object store of the archival storage system of the LTSS. To that end, the technique involves managing index data structures to enable efficient garbage collection (GC) across a very large number of data objects. FIG. 9 is a flow chart of a procedure for performing garbage collection for data in the LTSS of the archival storage system in accordance with the technique.

Assume a base (reference) snapshot vdisk 1 (e.g., vdisk 550*a*) is generated from vdisk 235 and is organized as data storage unit 1. Illustratively, the snapshot vdisk 1 is apportioned into a plurality of ("n") data objects. If the snapshot vdisk 1 has an address space of 1 TB and each data object has a (logical) address space of 16 MB, then there are 1 TB/16 MB="n" data objects associated with (and initially exclusively owned by) the data storage unit 1 (e.g., snapshot vdisk 1). Now assume snapshot vdisk 2 (e.g., vdisk 550*b*) is generated that has 1 GB of changed (A) data, e.g., at offset range of 5 GB-6 GB of snapshot vdisk 1, such that there are 1 GB/16 MB="m" data objects associated with (and initially exclusively owned by) the data storage unit 2 as A snapshot vdisk 2 (e.g., A snapshot vdisk 550*c*). Thus, for address space 0-5 GB and 6 GB-1 TB, A snapshot vdisk 2 inherits (i.e., references) the same "n-m" data objects as are present in snapshot vdisk 1 (snapshot 1).

Now, assume a snapshot has expired per a retention policy and a determination is rendered as to whether the snapshot can be deleted (i.e., garbage collected). The object store has numerous snapshots with various dependencies and interrelationships. In an embodiment, the following steps of the procedure 900 are illustratively performed by the frontend data service 710 although it is known to persons of skill in the art that the procedure may be performed by other services. The procedure starts at 905 and proceeds to the following steps:

1. At step 910, scan the index data structure (tree) (e.g., index data structure 800) of the expiring snapshot from its root node to its leaf nodes to obtain a first set of object IDs associated with data objects referenced by the leaf nodes.
2. At step 920, scan the index data structure (tree) of the immediate predecessor (parent) snapshot from its root node to its leaf nodes to obtain a second set of object IDs associated with data objects referenced by the leaf nodes.
3. At step 930, compare the first and second sets of object IDs. The object IDs that match are inherited from the parent snapshot (i.e., reference data objects from the parent snapshot) and may not be deleted. The matching object IDs are removed from the first set of object IDs.
   a. The remaining object IDs from the first set represent data objects exclusive to (generated by) the expiring snapshot (i.e., are not inherited from the parent snapshot) and are candidates for GC. Note that these data objects are only candidates (not certain) for GC because an immediate successor (child) snapshot of the expiring snapshot may still inherit one or more of the data objects.
4. At step 940, scan the index data structure (tree) of the immediate successor (child) snapshot from its root node to its leaf nodes to obtain a third set of object IDs associated with data objects referenced by the leaf nodes.
   a. In an embodiment, there may be multiple children snapshots that are immediate successors to the expiring snapshot. For this embodiment, each index data structure (tree) for each child snapshot is separately scanned from its root node to its leaf nodes to obtain another (i.e., separate) third set of objects IDs associated with data objects referenced by the leaf nodes.
5. At step 950, compare the first set of objects IDs with each of the third set of object IDs. The object IDs that match are inherited from the expiring snapshot and, thus, may not be deleted. The matching object IDs are removed from the first set of object IDs.
   a. The remaining object IDs from the first set represent data objects exclusively owned by the expiring snapshot (i.e., are not inherited from the parent snapshot and are not inherited by the child snapshot and any subsequent snapshot) and thus may be GC'd. Note that if a child snapshot does not inherit a data object from the expiring snapshot, then any grandchild also cannot inherit that data object.
   b. Of the matching object IDs that are inherited from the expiring snapshot by the child snapshot, there may be a fractional (partial) sharing or overlapping of the associated data objects. Accordingly, the inherited data objects represented by these matching object IDs are candidates for compaction. As such, the technique determines whether the matching object IDs are overlapping.

In an embodiment, compaction may be effected by preserving (storing) the partially overlapping snapshot data of an inherited data object to another data object. For example, assume a child snapshot inherits a data object from an expiring snapshot that partially overlaps a 1 MB address space of snapshot data. The inherited data object may not be deleted until the overlapping snapshot data is re-written to another data object to remove the overlap by an operation that involves, e.g., reading the overlapping snapshot data of the candidate data object and writing the data to a new (or existing) data object. However, such an operation is costly in terms of processing and, as such, may be desirable only if it results in substantial storage space cost savings. That is, a cost tradeoff involves consideration of performing compaction (e.g., I/O access and computation) vs. cost savings from reduced storage consumption.

According to the technique, if the fractional overlap (i.e., utilization) of the inherited data object is above a predetermined threshold, then the data object is treated as any other inherited data object (as in Step 930) and is not deleted. In an embodiment, the predetermined threshold may be 15%, although other percentages of utilization may be similarly employed. However, if the utilization of the inherited data object is below the predetermined threshold, then the data object may be compacted. Illustratively, the overlapping snapshot data may be read and written to a new data object of the child snapshot, wherein the new data object has the same object ID as the inherited data object. The inherited data object of the expiring snapshot may then be deleted by, e.g., deleting the reference to the object in the leaf node of the expiring snapshot. Note that the threshold may be determined based on a cost model of compaction vs. storage savings according to the archival storage vendor services pricing (e.g., relatively high cost to write data, but low cost to retrieve and store data).

In an embodiment, an internal structure of a data object (not shown) is organized into one or more "slices" representing offset ranges of the logical address space of the data object. Each slice has a metadata header used to specify an offset range for valid snapshot data. Essentially, when performing compaction, the nodes of the index data structure (B+ tree) are not modified; only the metadata headers of data objects referenced by the (leaf) nodes are revised/updated (e.g., by the frontend data service of LTSS) to specify offset ranges of valid snapshot data. In this manner, only a small amount of information (i.e., the header information) is changed without affecting the references of the leaf nodes, which may involve a large number of snapshots for very old data. That is, invalid ranges (i.e., deleted by garbage collection) of snapshot data are removed from the metadata header without a need to change the index data structures.

6. At step 960, delete the exclusively-owned data objects for the expiring snapshot represented by the object IDs remaining from the first set of object IDs (after steps 910 to 950).

The procedure ends at the following step 970.

Advantageously, the technique described herein improves storage efficiency of an object store by enabling deletion of data objects exclusively-owned by expiring snapshots from an object store. The technique enables efficient determination of the exclusively owned data objects through inspection of index data structures associated with an expiring snapshot, its immediate predecessor (parent) snapshot, and its immediate successor (child) snapshot. The efficient determination provided by the technique is scalable, independent of the number of snapshots maintained in the object store and is capable of offloading to server-less compute nodes to reduce network overhead to the object store. Notably, the technique does not require accessing the data objects to determine candidates for deletion (garbage collection) or compaction; such determination is realized entirely by inspecting the associated index data structures.

While there have been shown and described illustrative embodiments for improving storage efficiency of an object store configured to maintain numerous snapshots for long-term storage in an archival storage system, it is to be understood that various other adaptations and modifications may be made within the spirit and scope of the embodiments herein. For example, embodiments have been shown and described herein with relation to efficiently determining data that is exclusively owned by an expiring snapshot to allow deletion of the expiring snapshot from the object store. However, the embodiments in their broader sense are not so limited, and may, in fact, allow for still further storage efficiency improvements by determining exclusive ownership of data objects by other snapshots maintained in the object store.

For instance, in one or more embodiments, long-term storage of snapshots in the object store may be governed by, e.g., compliance purposes, wherein the time periods for retaining the snapshots may vary as specified by policy. Here, certain snapshot retention policies may specify that certain snapshots may not be accessed for many years. Such policies may provide opportunities to relocate long-term storage of the affected snapshots to slower (cheaper) storage tiers of the object store. Likewise, other retention policies may specify that other snapshots be more frequently accessed; these policies may provide opportunities to relocate the affected snapshots to faster (more expensive) storage media tiers of the object store. However, relocation of the snapshots may be conditioned on exclusive ownership of the data objects used by the snapshots. The technique described herein may be employed to determine such exclusive ownership.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the objective of the appended claims to cover all such variations and modifications as come within the true spirit and scope of the embodiments herein.

What is claimed is:

1. A method comprising:
    scanning a first index data structure mapping a first address space of a first snapshot of a logical entity to a second address space of data objects of an archival storage system, wherein the scan forms a first set of the data objects in the first snapshot, the logical entity organized according to extents written to the data objects;
    scanning a second index data structure of a second snapshot of the logical entity to form a second set of the data objects in the second snapshot, wherein the second snapshot is a parent of the first snapshot;
    deleting matching data objects in the second set from the first set;
    scanning a third index data structure of a third snapshot of the logical entity for the data objects, wherein the third snapshot is a child of the first snapshot;
    deleting matching data objects in the third set from the first set; and
    garbage collecting data objects remaining in the first set from a data store of the archival storage system, thereby removing the first snapshot from the archival storage system.

2. The method of claim 1 wherein leaf nodes of the index data structures include identifiers (IDs) of the data objects and the sets are formed from the IDs.

3. The method of claim 1 wherein garbage collecting data objects remaining in the first set further comprises:
    modifying metadata of the data objects referenced by leaf nodes of the index data structures to remove offset ranges for invalid data objects.

4. The method of claim 1, wherein the first snapshot is selected based on a snapshot retention policy.

5. The method of claim 1, wherein deleting matching data objects in the third set from the first set further comprises:
    determining whether at least two data objects overlap; and
    in response to determining that the at least two data objects overlap, compacting one of the at least two data objects to remove the overlap.

6. The method of claim 5, wherein compacting one of the at least two data objects is based on a predetermined threshold of an amount of fractional overlap.

7. The method of claim 5, wherein compacting one of the at least two data objects is based on a comparison of a cost of performing the compacting versus a cost savings from reduced storage consumption.

8. The method of claim 1, further comprising relocating the first snapshot from a first storage tier of the archival storage system to a second storage tier of the archival storage system, wherein the second storage tier has a lower access time than the first storage tier, and wherein relocation of the first snapshot is conditioned on exclusive ownership of the data objects used by the first snapshot.

9. A non-transitory computer readable medium including program instructions for execution on a processor, the program instructions configured to:
    scan a first index data structure mapping a first address space of a first snapshot of a logical entity to a second address space of data objects of an archival storage system, wherein the scan forms a first set of the data objects in the first snapshot, the logical entity organized according to extents written to the data objects;

scan a second index data structure of a second snapshot of the logical entity to form a second set of the data objects in the second snapshot, wherein the second snapshot is a parent of the first snapshot;

delete matching data objects in the second set from the first set;

scan a third index data structure of a third snapshot of the logical entity for the data objects, wherein the third snapshot is a child of the first snapshot;

delete matching data objects in the third set from the first set; and garbage collect data objects remaining in the first set from a data store of the archival storage system, thereby removing the first snapshot from the archival storage system.

10. The non-transitory computer readable medium of claim 9, wherein leaf nodes of the index data structures include identifiers (IDs) of the data objects and the sets are formed from the IDs.

11. The non-transitory computer readable medium of claim 9, wherein the program instructions for execution on the processor configured to garbage collect data objects remaining in the first set are further configured to:

modify metadata of the data objects referenced by leaf nodes of the index data structures to remove offset ranges for invalid data objects.

12. The non-transitory computer readable medium of claim 9, wherein the first snapshot is selected based on a snapshot retention policy.

13. The non-transitory computer readable medium of claim 9, wherein the program instructions for execution on the processor configured to delete matching data objects in the third set from the first set are further configured to:

determine whether at least two data objects overlap; and in response to determining that the at least two data objects overlap, compact one of the at least two data objects to remove the overlap.

14. The non-transitory computer readable medium of claim 13, wherein the program instructions for execution on the processor configured to compact one of the at least two data objects is based on a predetermined threshold of an amount of fractional overlap.

15. The non-transitory computer readable medium of claim 13, wherein the program instructions for execution on the processor configured to compact one of the at least two data objects is based on a comparison of a cost of performing the compacting versus a cost savings from reduced storage consumption.

16. The non-transitory computer readable medium of claim 9, wherein the extents are organized in the data objects according to a preferred size of the data objects for the archival storage system.

17. An apparatus comprising:

a frontend data service connected via a network to an archival storage system, the frontend data service executing instructions on a processor configured to:

scan a first index data structure mapping a first address space of a first snapshot of a logical entity to a second address space of data objects of an archival storage system, wherein the scan forms a first set of the data objects in the first snapshot, the logical entity organized according to extents written to the data objects;

scan a second index data structure of a second snapshot of the logical entity to form a second set of the data objects in the second snapshot, wherein the second snapshot is a parent of the first snapshot;

delete matching data objects in the second set from the first set;

scan a third index data structure of a third snapshot of the logical entity for the data objects, wherein the third snapshot is a child of the first snapshot;

delete matching data objects in the third set from the first set; and garbage collect data objects remaining in the first set from a data store of the archival storage system, thereby removing the first snapshot from the archival storage system.

18. The apparatus of claim 17, wherein the frontend data service executing instructions on the processor configured to garbage collect data objects remaining in the first set further executes instructions on the processor configured to:

modify metadata of the data objects referenced by leaf nodes of the index data structures to remove offset ranges for invalid data objects.

19. The apparatus of claim 17, wherein the first snapshot is selected based on a snapshot retention policy.

20. The apparatus of claim 17, wherein the frontend data service executing instructions on the processor configured to delete matching data objects in the third set from the first set further executes instructions on the processor configured to:

determine whether at least two data objects overlap; and in response to determining that the at least two data objects overlap, compact one of the at least two data objects to remove the overlap.

21. The apparatus of claim 20, wherein the frontend data service executing instructions on the processor configured to compact one of the at least two data objects is based on a predetermined threshold of an amount of fractional overlap.

22. The apparatus of claim 20, wherein the frontend data service executing instructions on the processor configured to compact one of the at least two data objects is based on a comparison of a cost of performing the compacting versus a cost savings from reduced storage consumption.

23. The apparatus of claim 17, wherein the extents are organized in the data objects according to a preferred size of the data objects for the archival storage system.

24. The apparatus of claim 17, wherein leaf nodes of the index data structures include identifiers (IDs) of the data objects and the sets are formed from the IDs.

* * * * *

UNITED STATES PATENT AND TRADEMARK OFFICE
CERTIFICATE OF CORRECTION

Page 1 of 3

PATENT NO. : 11,829,328 B2
APPLICATION NO. : 17/514603
DATED : November 28, 2023
INVENTOR(S) : Abhishek Gupta et al.

It is certified that error appears in the above-identified patent and that said Letters Patent is hereby corrected as shown below:

In the Specification

Column 4, Line 24 reads:
"an abstraction of a distributed storage fabric (DSP) 250 that"
Should read:
--an abstraction of a distributed storage fabric (DSF) 250 that--

Column 4, Line 43 reads:
"the CVM 300, which exports one or more iSCSI, CIF'S, or"
Should read:
--the CVM 300, which exports one or more iSCSI, CIFS, or--

Column 4, Line 53 reads:
"and/or HDDs) located in DSP 250 of the cluster 100."
Should read:
--and/or HDDs) located in DSF 250 of the cluster 100.--

Column 4, Line 55 reads:
"employed to enable IiO accesses from a UVM 210 to a"
Should read:
--employed to enable I/O accesses from a UVM 210 to a--

Column 4, Line 60 reads:
"an CIFS, or NFS request as part of its hardware emulation"
Should read:
--an ISCSI, CIFS, or NFS request as part of its hardware emulation--

Signed and Sealed this
Sixth Day of May, 2025

Coke Morgan Stewart
*Acting Director of the United States Patent and Trademark Office*

CERTIFICATE OF CORRECTION (continued)
U.S. Pat. No. 11,829,328 B2

Column 4, Line 67 reads:
"processed by the CVM 300. As used herein, the terms CIES"
Should read:
--processed by the CVM 300. As used herein, the terms iSCSI, CIFS--

Column 5, Line 10 reads:
"210 desires 110 services. The IP-based storage protocol"
Should read:
--210 desires I/O services. The IP-based storage protocol--

Column 5, Line 39 reads:
"within DSF 250 of the duster 100. Illustratively, the CVM"
Should read:
--within DSF 250 of the cluster 100. Illustratively, the CVM--

Column 5, Line 41 reads:
"each node and cooperates with other CVMs in the duster to"
Should read:
--each node and cooperates with other CVMs in the cluster to--

Column 5, Line 52 reads:
"the industry standard IP-based storage protocols (e.g., CIPS,"
Should read:
--the industry standard IP-based storage protocols (e.g., iSCSI, CIFS--

Column 5, Line 62 reads:
"manager MO may spawn another UVM 210 on the node. A"
Should read:
--manager 310 may spawn another UVM 210 on the node. A--

Column 6, Line 1 reads:
"with one or more replication workers 320b. A data manager"
Should read:
--with one or more replication workers 320b. A data I/O manager--

Column 6, Line 5 reads:
"Illustratively, the data UO manager 330 presents a vdisk 235"
Should read:
--Illustratively, the data I/O manager 330 presents a vdisk 235--

Column 6, Line 6 reads:
"to the UVM 210 in order to service 110 access requests by"
Should read:
--to the UVM 210 in order to service I/O access requests by--

CERTIFICATE OF CORRECTION (continued)
U.S. Pat. No. 11,829,328 B2

Column 6, Line 24 reads:
"extents may, be grouped together in a unit called an extent"
Should read:
--extents may be grouped together in a unit called an extent--

Column 6, Line 57 reads:
"has an associated block map 520, metadata mapping with"
Should read:
--has an associated block map 520, i.e., a metadata mapping with--

Column 6, Line 60 reads:
"DSF 250, Advantageously, associating a block map with a"
Should read:
--DSF 250. Advantageously, associating a block map with a--

Column 7, Line 15 reads:
"The lazy copy procedure may configure DST 250 to wait"
Should read:
--The lazy copy procedure may configure DSF 250 to wait--

Column 7, Line 22 reads:
"modify) data in the snapshot vdisk 550, Depending upon the"
Should read:
--( i.e. modify) data in the snapshot vdisk 550. Depending upon the--

Column 7, Line 27 reads:
"pletely or substantially overwrite the contents of a vbloCk in"
Should read:
--pletely or substantially overwrite the contents of a vblock in--

Column 8, Line 43 reads:
"NFS, CIFS and MST, the LTSS 700 is accessed using"
Should read:
--NFS, CIFS and iSCSI, the LTSS 700 is accessed using--